(12) United States Patent
Fawcett et al.

(10) Patent No.: US 6,606,066 B1
(45) Date of Patent: Aug. 12, 2003

(54) TRI-MODE SEEKER

(75) Inventors: James M. Fawcett, Ellicott City, MD (US); Christopher B. Schwerdt, deceased, late of Catonsville, MD (US); S. Schwerdt, legal representative, Catonsville, MD (US); Gary D. Baldwin, Columbia, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/003,188

(22) Filed: Oct. 29, 2001

(51) Int. Cl.[7] .................. H01Q 21/00; H01Q 13/00
(52) U.S. Cl. ................. 343/725; 343/781 CA; 343/786
(58) Field of Search ............... 343/720, 725, 343/781 CA, 786, 781 P, 779

(56) References Cited

U.S. PATENT DOCUMENTS

| 5,214,438 A | | 5/1993 | Brusgard et al. ........... 343/725 |
| 5,307,077 A | * | 4/1994 | Branigan et al. ........... 343/720 |
| 5,973,649 A | * | 10/1999 | Andressen ................. 343/720 |
| 6,225,955 B1 | * | 5/2001 | Chang et al. ............... 343/720 |
| 6,295,034 B1 | * | 9/2001 | Brown et al. .......... 343/781 CA |

* cited by examiner

*Primary Examiner*—Hoang Nguyen
(74) *Attorney, Agent, or Firm*—Birch, Stewart, Kolasch & Birch, LLP

(57) ABSTRACT

A single receiving aperture used, for example, in an airborne seeker system collects energy for three discrete energy sensors/receivers including a laser spot tracker, an RF (millimeter wave) transmitter/receiver, and an infrared detector. The RF transmitter/receiver is located at the focus of a primary reflector located on a gimbal assembly. A selectively coated dichroic element is located in the path of the millimeter wave energy which reflects infrared energy from the primary reflector to an optical system which re-images the infrared energy on the infrared detector. The outer edge or rim of the primary reflector is deformed so that the incoming laser energy focuses to a location beyond the RF transmitter/receiver. The laser sensor is positioned adjacent the RF transmitter/receiver at this location in a back-to-back orientation. The laser energy is then detected using a secondary reflector and an optical system which directs the laser energy from the secondary reflector to a laser detector.

18 Claims, 8 Drawing Sheets

TRI-MODE SEEKER

BACKGROUND OF THE INVENTION

1. Field of the Invention

This invention relates generally to antenna sensors and more particularly to a millimeter wave, infrared and laser sensor employing a common receiving aperture.

2. Description of Related Art

Single mode sensors used, for example, in missile seekers are known to exhibit degraded performance because of false target acquisitions. In order to overcome this inherent deficiency, a dual-mode seeker including millimeter wave (MMW) and infrared (IR) sensors has been developed. One such system which substantially improves false alarm rate is shown and described in U.S. Pat. No. 5,214,435 entitled, "Millimeter Wave and Infrared Sensor In A Common Receiving Aperture", issued to T. C. Brusgard et al. on May 25, 1993, the details of which are incorporated herein by reference. There an integrated millimeter wave (MMW) and an infrared (IR) common aperture sensor includes a common primary reflector for infrared and millimeter wave energy. An active transmitter/receiver millimeter wave horn assembly located at the focus of the primary mirror transmits and receives millimeter wave signals off of the primary reflector. A selectively coated dichroic element is located in the path of the millimeter wave energy on the axis between the feed and the primary reflector. The dichroic element reflects infrared energy from the primary mirror to a focal point and at the same time transmits and focuses millimeter wave energy to a transmitter/receiver. An optical system relays the infrared energy to a focal plane behind the primary mirror. The dichroic element transmits and focuses millimeter wave energy without significant attenuation such that optical and millimeter wave energy may be employed on a common boresight. Weather conditions and the time of day may adversely affect the ability of an infrared sensor to acquire the target while not affecting millimeter wave energy. Infrared has better resolution at closer ranges and the two can complement each other in target acquisition and rejection of countermeasures.

Although a single mode laser type missile seeker is also known, it relies on an external laser designator to pick out a target which further ensures reliable target acquisition. However, the laser designation may not be on the sweetest part of the target and the infrared can determine the optimum terminal aimpoint. Weather also affects the range performance of a laser designator system.

As processing has gotten faster and sensors have gotten smaller, more capability can be put into the same volume. This is particularly true of missile seekers and their capability to autonomously find and negate targets.

SUMMARY

It is an object of the present invention, therefore, to provide an improvement in multi-mode sensors.

It is another object of the present invention to provide an assembly of multi-mode sensors located in a common receiving aperture.

It is still another object of the invention to provide a seeker having multi-mode sensors located in a common receiving aperture so as to minimize platform size and weight while providing essentially no increase in volume.

These and other objects are achieved by an improvement in the system taught in the above referenced Brusgand et al. patent by the inclusion of a laser spot tracker in the system. In the present invention, a single receiving aperture collects energy from a millimeter wave (MMW) RF sensor, an infrared (IR) sensor and a semi-active laser energy sensor aligned on a common central axis. An active millimeter wave transmitter/receiver is located at the focus of a primary mirror aperture. A selectively coated dichroic element is located in the path of millimeter wave energy and feeds the energy to an RF detector while reflecting infrared energy from the primary reflector to an optics system which re-images the IR energy on an infrared detector. The edge of the primary mirror is furthermore bent so that laser energy focuses beyond the RF receiver and thus produces no detrimental affects on either the RF or the IR energy received. The laser energy is captured using a second lens system located in front of the dichroic element and the RF receiver.

Since weather affects the performance of both IR and laser type sensor/receivers, an RF sensor can locate a target until the laser and infrared receiver can get close enough to see through any adverse weather.

Further scope of applicability of the present invention will become apparent from the detailed description provided hereinafter. It should be understood, however, that the detailed description and specific examples, while disclosing the preferred embodiments of the invention, it is given by way of illustration only, since various changes and modifications coming within the spirit and scope of the invention will become apparent to those skilled in the art from this detailed description.

BRIEF DESCRIPTION OF THE DRAWINGS

The present invention will become more fully understood when considered in conjunction with the accompanying drawings which are provided by way of illustration only, and thus are not meant to be limitative of the invention, and wherein.

DETAILED DESCRIPTION OF THE INVENTION

Figure 1:
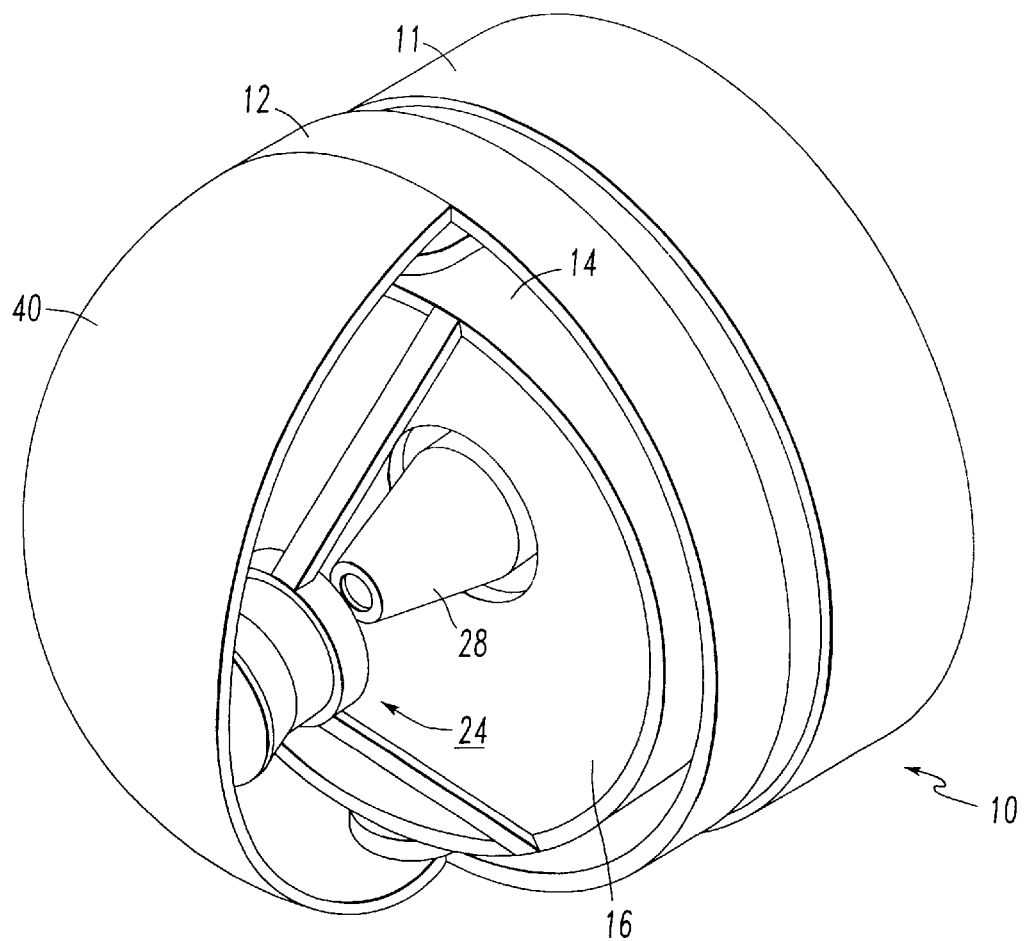
FIG. 1 is a partially cutaway perspective view of a first embodiment of a tri-mode seeker in accordance with the subject invention.

This invention is directed to a common aperture for three receivers/sensors of millimeter wave (MMW,) infrared (IR)

and laser energy which are coaxially aligned on a common boresight or central longitudinal axis (CL) of seeker apparatus used, for example, in an airborne platform such as a missile.

Referring now to the drawings wherein like reference numerals refer to like components throughout, reference is first made to FIGS. 1–6 wherein a tri-mode seeker 10, is depicted in accordance with a first embodiment of the invention. Reference numeral 11 in FIGS. 1 and 2 denotes an annular base member to which is secured a collar 12, for supporting a gimbal assembly 14 on which is mounted the components of the seeker. Reference numeral 16 denotes a primary mirror 16 assembly which includes a parabolic reflecting surface 15 and central opening 18 through which passes an infrared (IR) sensor/receiver 20 which is secured to a rear base portion 22.

Located in front of the IR receiver 20 is a millimeter wave (MMW) transmitter/receiver 24 which both transmits RF energy to a target and receives the RF energy reflected therefrom. A dichroic mirror assembly 26 is mounted on the outside of the MMW transmitter/receiver 24 facing the IR receiver 20. The dichroic mirror assembly 26 allows RF energy to pass therethrough to the transmitter/receiver 24 while reflecting IR energy to an optical system 28 which forms part of the IR receiver 20.

A laser spot tracker 30 is mounted on the back side of the MMW transmitter/receiver assembly 24 and includes a semi-active laser sensor assembly 32 including an immersion lens system 34. In this embodiment of the invention, the inversion lens system 34 includes a secondary parabolic mirror 36, an optical bandpass filter 37, and a convex focusing lens 38. A spheroidal radome 40 having a rounded front end is fitted over the outside of the secondary mirror 36 and is affixed to the collar 12.

Figure 2:
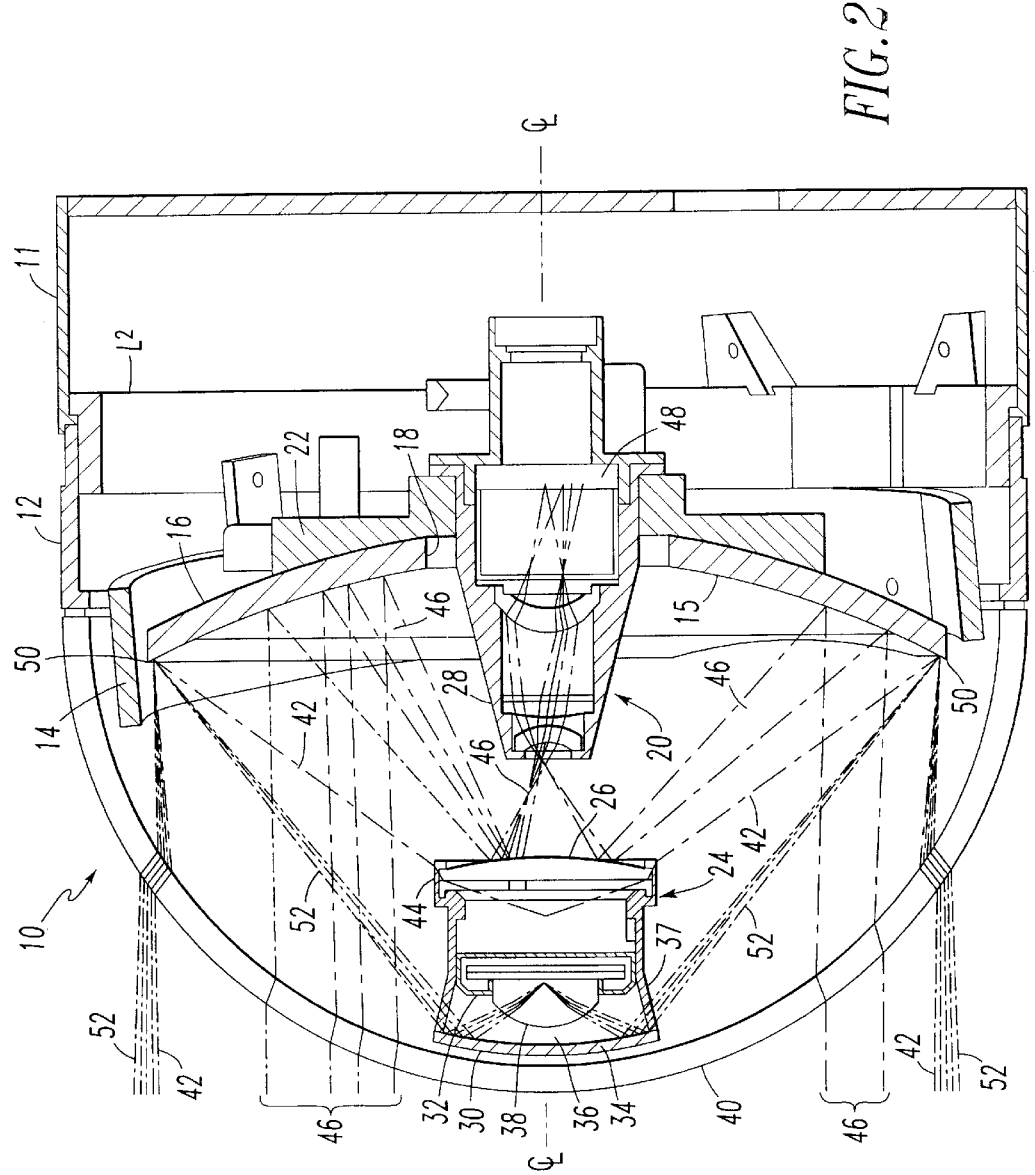
FIG. 2 is a longitudinal central cross-section of the embodiment of the invention shown in FIG. 1.

As further shown in FIG. 2, received RF energy 42 passing through the radome 40 is focused to a patch antenna element 44 of the RF transmitter/receiver assembly 24. Incident IR energy 46, however, is reflected off the face 15 of the primary mirror 16 where it is reflected again by the surface of the dichroic mirror 26 to the optical system 28 where it is fed to a cryogenically cooled IR detector element 48 located in the focal plane of the optical system 28.

Figure 3:
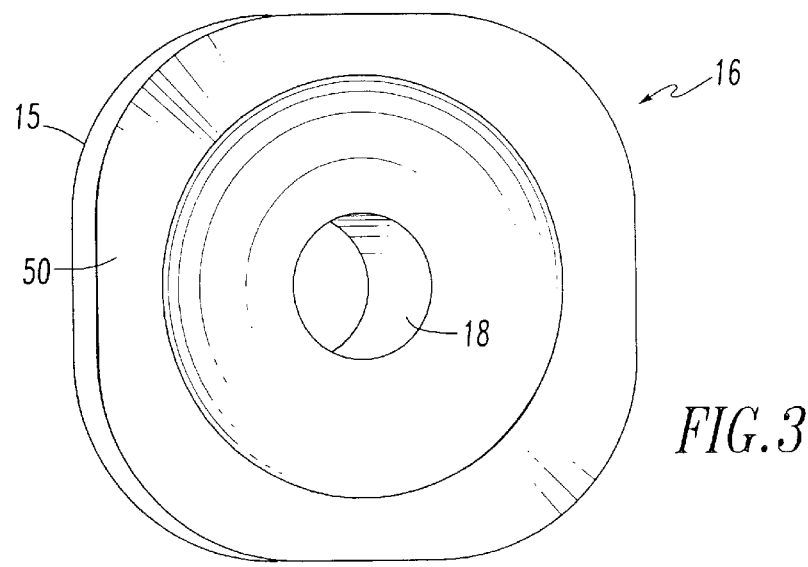
FIG. 3 is a front planar view of the primary mirror included in the embodiment of the invention shown in FIG. 2.
Figure 4:
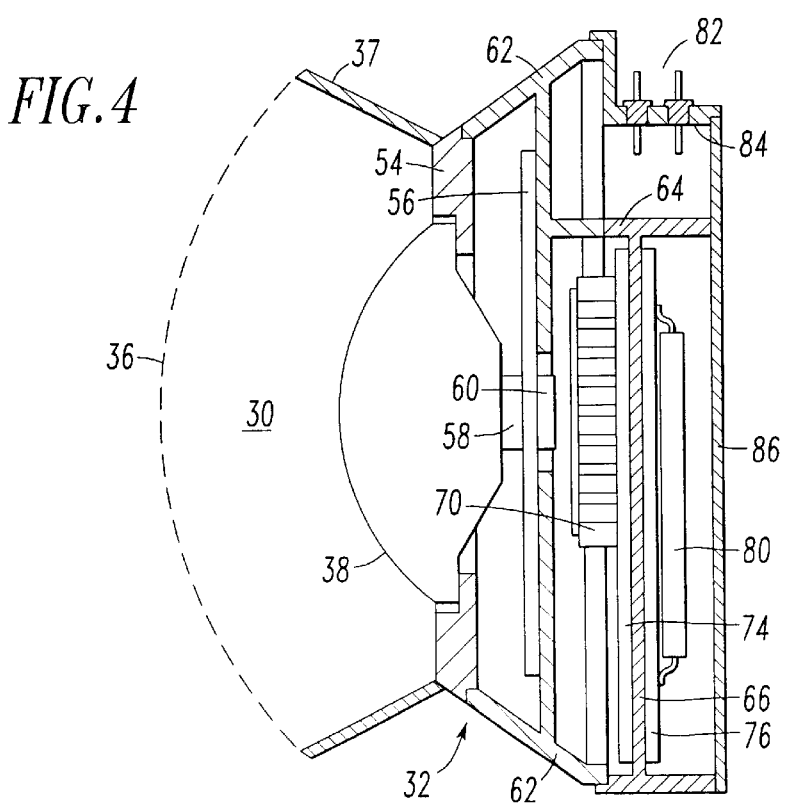
FIG. 4 is a central cross-sectional view of the laser sensor of the tri-mode seeker shown in FIG. 2.
Figure 5:
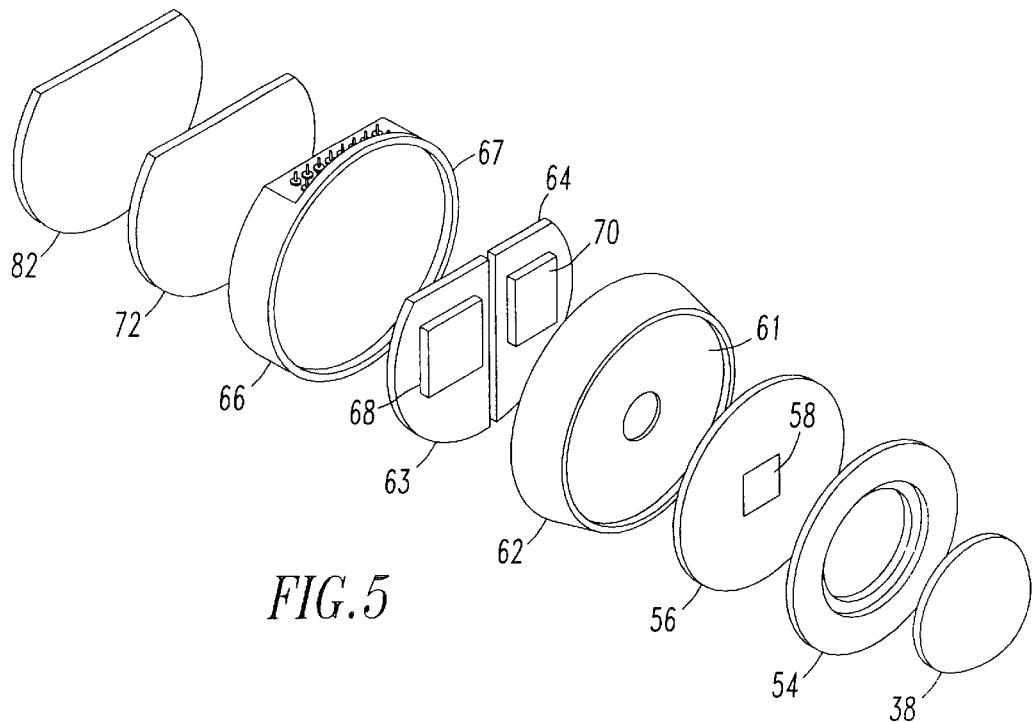
FIGS. 5 and 6 are illustrative of front and back exploded perspective views of the laser sensor shown in FIG. 4.
Figure 6:
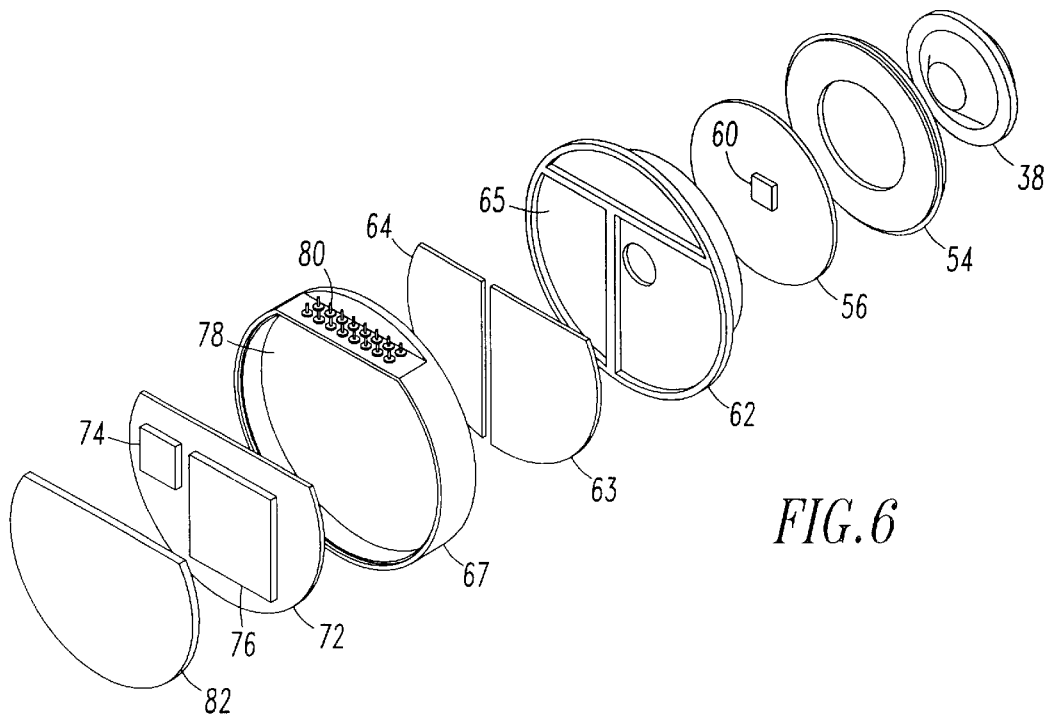

The outer peripheral edge 50 of the primary mirror 16, as shown in FIG. 3, is slightly bent so that laser energy 52 is reflected to the surface of the secondary mirror 36 where it is again reflected through the lens 38 to the laser sensor 32, the components of which are shown in FIGS. 4, 5 and 6.

Referring now to FIGS. 5 and 6, in addition to the lens 38 which is mounted on an annular front cover member 54, the laser sensor assembly 32 additionally includes a flat circular component support member 56 called a circuit card assembly (CCA) member 56 having a quadrant avalanche photodiode detector (QAPD) 58 or equivalent laser sensor mounted on the front side thereof, and an application specific integrated circuit (ASIC) package 60 is mounted on the back side thereof. An avalanche photodiode device is a well known circuit element and comprises a solid state device manufactured and supplied by Perkin Elmer Optoelectronics, which is a company located in Vaudreuil, Quebec, Canada. An ASIC is a circuit element well known in the semiconductor electronics and is designed to perform a specific function. Further, the CCA member 56 is adapted to be mounted on the face 61 (FIG. 5) of a front chassis member 62.

A pair of CCAs 63 and 64 are located between the rear surface 65 (FIG. 6) of the front chassis member 62 and face 66 of a rear chassis member 67. An MMW transmitter in the form of a "HOTLink"™ digital communication link 68 and an analog-to-digital A/D converter 70 are mounted on the front of the CCAs 63 and 64 as shown in FIG. 5. A fourth CCA 72, on which is mounted an oscillator (OSC) package 74 and a field programmable gate array (FPGA) 76, a device having a plurality of devices which can be selectively configured on demand, is fitted to the rear surface 78 of the rear chassis member 67 as shown in FIG. 6. A set of connector pins 80 is located on an outer peripheral portion 84 of the rear chassis. Finally, a flat rear cover 82 is secured to the rear chassis member 67.

The combination of the secondary lens 36, the immersion lens 38, and the electronic components described above form a compact package which makes the laser sensor 30 compatible with the system shown and described, for example, in the above referenced Brusgard et al. patent, U.S. Pat. No. 5,214,438.

Referring now to FIGS. 7–10, shown thereat is a second embodiment of the invention and comprises a modification of the embodiment shown and described with respect to FIGS. 1–6. The second embodiment comprises a tri-mode seeker 10' also having three sensor/receivers of MMW, IR and laser energy integrated into a single composite assembly.

Figure 7:
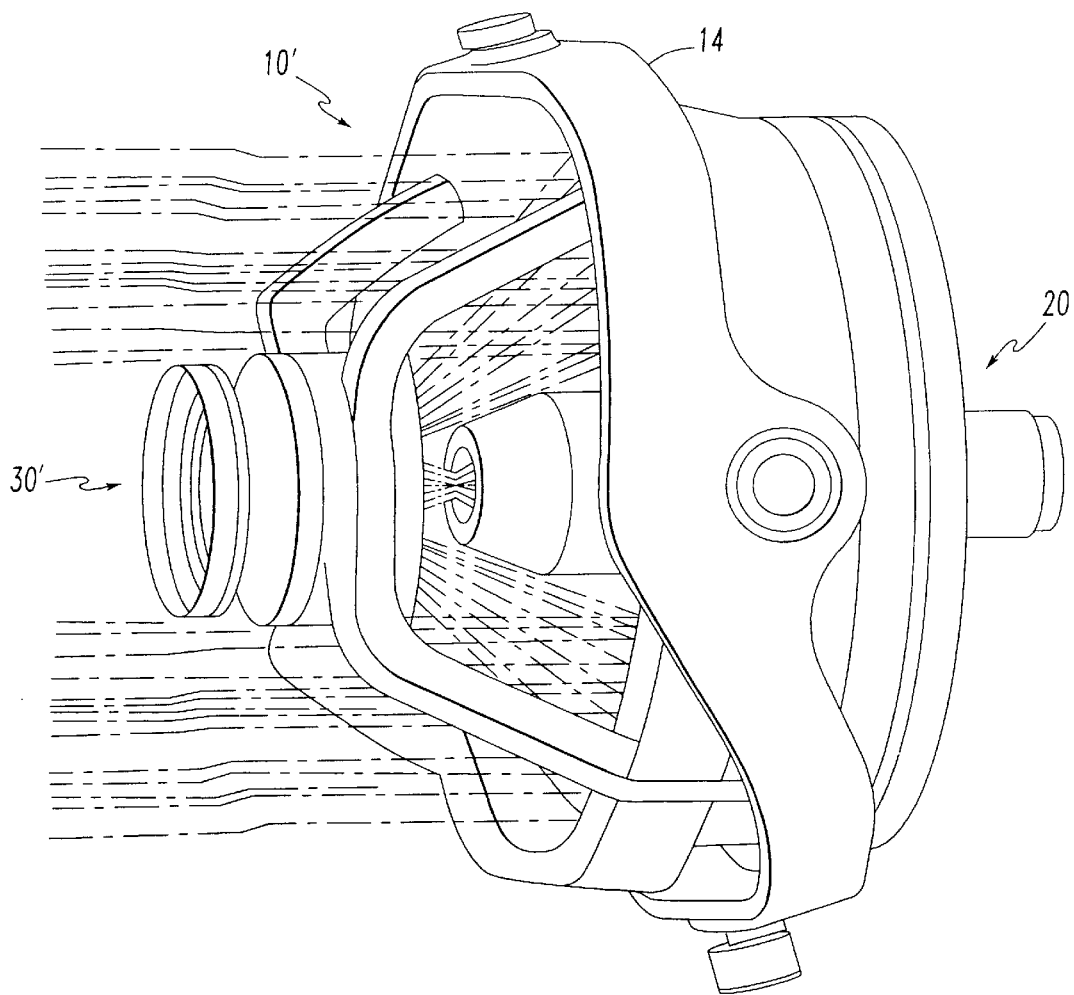
FIG. 7 is a perspective view of a second embodiment of the subject invention.
Figure 8:
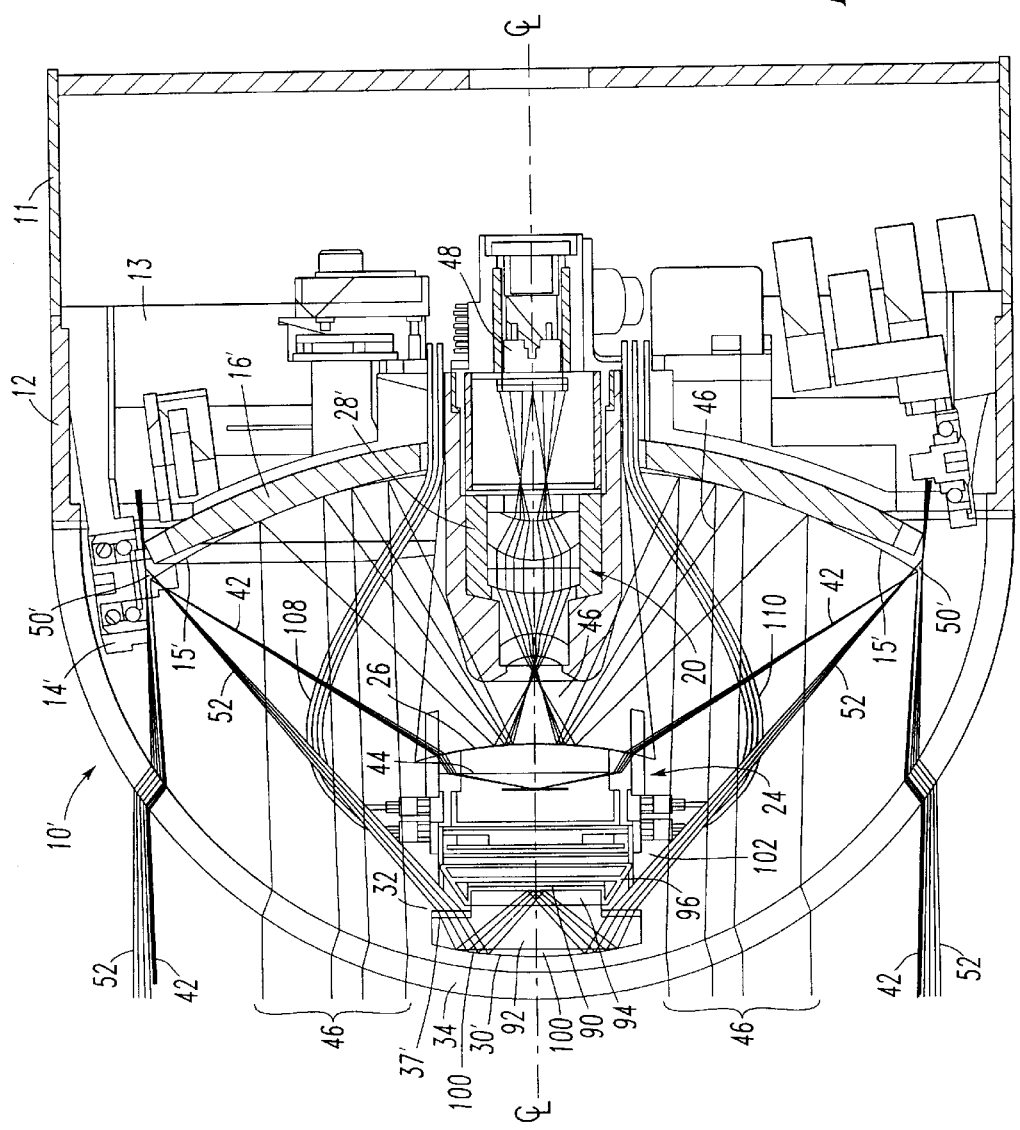
FIG. 8 is a central longitudinal cross-sectional view of the second embodiment of the invention shown in FIG. 7.

As shown, for example, in FIGS. 7 and 8, the seeker 10' includes, among other things, a primary mirror assembly 16, including a reflector 15', IR sensor/receiver 20 and a MMW transmitter and receiver 24 substantially as before; however, the laser sensor 30 (FIG. 2) is modified as shown in FIGS. 7 and 8 by reference numeral 30' as well as certain relatively minor structural changes, for example, to the gimbal system 14' which need not be considered in any significant detail as it relates to the inventive subject matter of the present invention.

Figure 9:
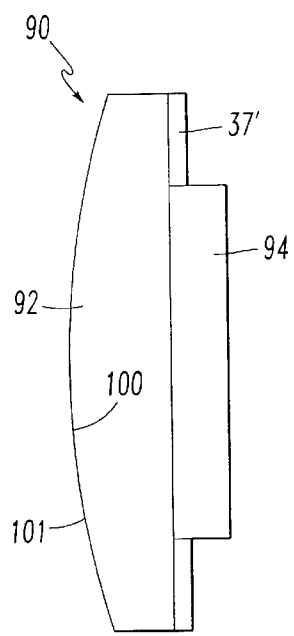
FIG. 9 is a central longitudinal sectional view of the lens system shown in FIG. 8.

Whereas the first embodiment utilized a separate secondary mirror element 36 and immersion lens 38, the second embodiment as shown, for example in FIG. 8, now eliminates the discrete mirror element 36 in favor of an immersion lens assembly 90 which integrates the secondary mirror function therein. As shown in FIG. 9, the lens assembly 90 is comprised of two lens components 92 and 94, which are fitted together as a composite lens assembly for mounting on a chassis member 96 shown in FIG. 10 along with a bandpass light filter 37' in the form of a ring being located on the back side of the lens 92 around the periphery of the flat lens element 94. What is significant about the immersion lens configuration 90 is that the secondary mirror function now embodied in the concave surface area 100 having a reflective coating 101 applied to the outer surface thereof. As shown in FIG. 8, laser energy reflected off of the outer edge 50' of the mirror surface 15' passes through the ring filter 37' to the surface 100 of the immersion lens 90 where it is re-reflected back to the photodetector 58.

Figure 10:
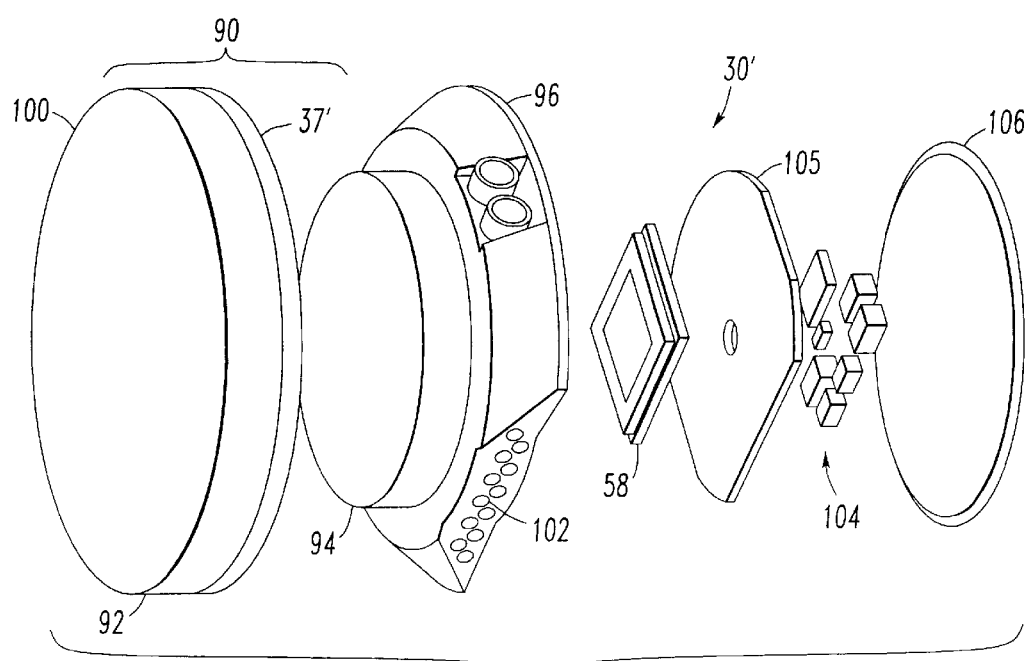
FIG. 10 is an exploded perspective view of the laser sensor of the second embodiment shown in FIGS. 7 and 8.
Figure 11:
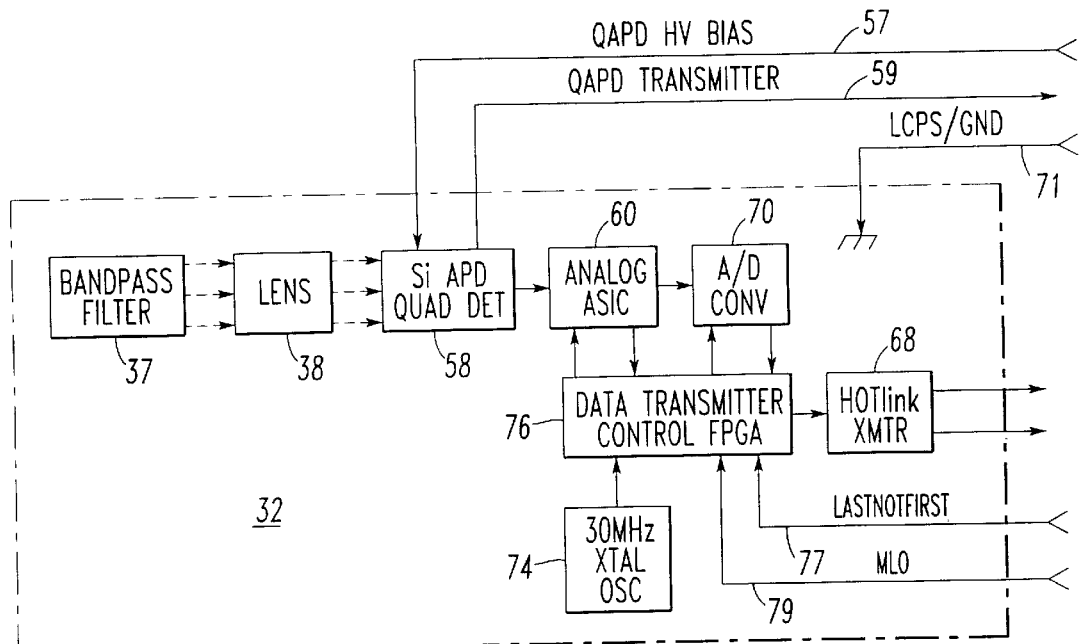
FIG. 11 is an electrical block diagram of one embodiment of the receiver portion of the laser sensor included in the embodiment of the subject invention shown in FIGS. 1 and 2.
Figure 12:
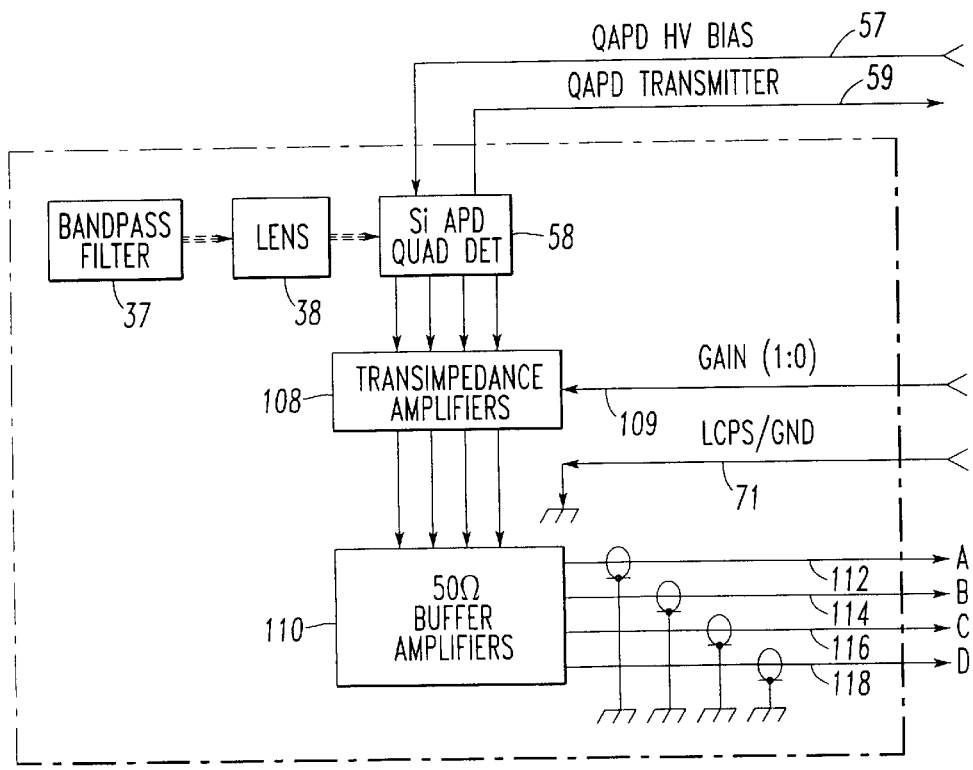
FIG. 12 is an electrical block diagram of a variation of the receiver portion of a laser sensor shown in FIG. 11.

Referring now to FIG. 10, the chassis 96 includes a set of pin connectors 102 for feeding signals generated by the circuit omponents 104 mounted on a CCA board 105 to external circuitry, not shown. The components include, for example, the quadrant avalanche photodiode detector (QAPD) 58 affixed to the flat circular CCA to the front side of CCA board 105. On the back side of the CCA board 105 are located some, if not all, of the electrical components shown in FIGS. 5 and 6 as well and become evident when the electrical block diagrams of FIGS. 11 and 12 are considered hereinafter. As further shown in FIG. 10, a circular rear cover member 106 is adapted to be fitted to the chassis 96 so as to protect the components mounted on the CCA board 105. FIG. 8 shows two cable assemblies 108 and 110 which are adapted to feed signals from both the laser receiver 34' and the RF transmitter/receiver 24 to the rear of the seeker assembly 10' for further processing.

Referring now to FIG. 11, shown thereat is an electrical block diagram of the electronics components shown in FIGS. 5 and 6 and associated with, but not necessarily with one embodiment of the semi-active laser receiver in the subject invention. As shown, laser energy is bandpass filtered by the filter 37 where it enters the immersion lens system 34 and from there it is directed to an optical detector which is comprised of an avalanche photodiode quadrature detector 58 implemented in solid state material such as silicon (Si). The APD quadrature detector 58 receives a bias voltage via a QAPD HV BIAS circuit lead 57 from an external source, not shown. A temperature signal indicative of the QAPD temperature is fed to external circuitry, not shown, for use in external signal processing circuitry, also not shown. A common ground lead 71 is shown being applied to the laser sensor assembly 32. Additionally, two input signals identified as "lastnotfirst" and MLO are fed to the FPTA 80 via circuit leads 77 and 79.

The output of the QAPD detector 58 is fed to the analog ASIC 60 where it is next fed to an analog to digital (A/D) converter 70. Analog signals from the ASCIC 60 and a digital output from the A/D converter 70 are fed to the FPGA 76 which operates in conjunction with a 30 MHz crystal oscillator 74 to control the HOT-link™ transmitter 68.

It should be noted with respect to the analog ASIC 60 that it is configured to include four (4) matched transimpedance pre-amplifiers, each with four selectable matched gain steps; a high pass filter at the output of each pre-amplifier; four matched gain post amplifiers; two (2) banks of eight (8) matched sample-and-hold circuits for each pre-amp and post-amp output; peak detection circuitry of the sum of the sample-and-hold circuits for event recognition; pulse shaping and target ambiguity circuitry for discrimination; and high-gain and low-gain circuits for providing data sets which are fed to the A/D converter 70.

A second embodiment of the semi-active laser receiver provides an analog output instead of a digital output and is shown in FIG. 12 where the HOT-link™ transmitter 68, the control FPGA 76 along with the analog ASIC 60 and A/D converter 70 are moved off the sensor portion 32 of the laser spot tracker 30 to another location and consists simply of four matched transimpedance amplifiers 108 which are coupled to the analog output of the QAPD 58. The transimpedance amplifiers have gain adjustment applied thereto via circuit lead 109. The output of the transimpedance amplifiers are fed to four (4) 50 ohm unbuffered amplifiers 110 whose respective outputs A, B, C and D are fed to external circuitry, not shown, via shielded cables 112, 114, 116 and 118.

In an exemplary tri-mode seeker in accordance with the subject invention, mounted in a platform such as a missile, laser radiation return from a target strikes the edge 50 of the primary mirror 16 about 0.3 inches around the periphery of the mirror which is tilted.

Because the reflection is around the edge of the mirror, the laser collecting area of approximately 27 sq.cm. on a five inch diameter mirror 16 is significant. Yet the combination of the objects, primary mirror and secondary mirror and immersion lens produces a 0.006 inch focus spot on a 0.19 inch laser quadrant detector 58. The primary mirror edge is bent so that the longer wavelength millimeter wave energy will still be passed onto the RF receiver. The primary mirror along with the relay infrared optics 28 is a F/2.5 optical system, which means that the infrared energy does not use the full aperture and is not distorted by the 0.3 inch bend in the primary mirror 16. Since the edge 50 of the primary mirror 16 is used for the laser receiver, the light rays are essentially parallel and a filter coating can be placed on the immersion lens that can be very narrow. A light filter with only 14 nm. bandpass can be used to reject other light energy besides the laser energy. Rejecting other light energy significantly reduces the background noise that can be generated in the detector and further enhances signal to noise ratio and therefore target range detection.

As the missile closes in on the laser spot source, the signal intensity at the laser spot receiver goes up proportional to the range squared. The dynamic range of the received signal can be in the order of 125 db. Switching the gain of the transimpedance amplifiers along with a 12 bit A/D 70 converter, placing four channels of switching amplifiers in an application specific integrated circuit or ASIC 60 saves considerable space for making a compact laser receiver that will fit on the front of the gimbal assembly 14.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A multi-mode receiving aperture, comprising:
   a laser energy sensor for detecting incident laser energy; and
   at least one other energy sensor coaxially aligned with the laser energy sensor along a central axis and sharing a common primary reflector,
   wherein said laser energy sensor is located forward of the primary reflector and includes a secondary reflector for receiving incoming laser energy reflected from a peripheral region of the primary reflector and an immersion lens for focusing the laser energy reflected from the secondary reflector to a laser energy detector.

2. A multi-mode receiving aperture according to claim 1 wherein said at least one other energy sensor comprises an RF energy sensor.

3. A multi-mode receiving aperture according to claim 2 wherein the RF energy sensor comprises a millimeter wave (MMW) transmitter/receiver.

4. A multi-mode receiving aperture according to claim 1 wherein said at least one other energy sensor comprises an infrared energy sensor.

5. A multi-mode seeker system mounted on a gimbal assembly of an airborne platform, comprising:
   a laser spot tracker assembly including a laser energy sensor; and
   at least one other energy sensor coaxially aligned with the laser energy sensor along a common axis and sharing a common primary reflector,
   wherein said at least one other energy sensor comprises both an infrared energy sensor and an RF energy sensor.

6. A multi-mode seeker system according to claim 5 wherein the RF energy sensor comprises a millimeter wave (MMW) transmitter/receiver.

7. A multi-mode seeker system according to claim 6 wherein said MMW transmitter/receiver is located at a focus of the primary reflector, said primary reflector having an outer edge or rim portion which is deformed so as to focus laser energy to a location beyond the MMW transmitter/receiver, and wherein the laser energy sensor is located at said location.

8. A multi-mode seeker system according to claim 6 and additionally including a dichroic element located in the path of energy reflected from the primary reflector for feeding received RF energy to the MMW transmitter/receiver and reflecting received infrared energy to the infrared energy sensor.

9. A multi-mode seeker system according to claim 8 and additionally including one or more optical elements located between the dichroic element and the infrared energy sensor for directing incoming infrared energy to an infrared detector.

10. A multi-mode seeker system according to claim 9 wherein the MMW transmitter/receiver and the laser energy sensor are coaxially mounted in back-to-back orientation along the central axis.

11. A multi-mode seeker system according to claim 10 wherein the secondary reflector comprises a discrete mirror element located adjacent the optical system of the laser energy sensor for focusing laser energy reflected from the primary reflector to the laser energy detector.

12. A multi-mode seeker system according to claim 10 wherein the secondary reflector is formed as part of the optical system of the laser energy sensor.

13. A multi-mode seeker system according to claim 10 wherein said optical system of the laser energy sensor includes an immersion lens and wherein the secondary reflector comprises a curved reflective surface of the immersion lens.

14. A multi-mode seeker system according to claim 10 wherein the primary and secondary reflectors include a parabolic reflective surface.

15. A multi-mode seeker system according to claim 10 and additionally including a light filter member placed in the path of laser energy reflected from the primary reflector to the secondary reflector.

16. A multi-mode seeker system according to claim 15 wherein the light filter member is affixed to the optical system of the laser energy sensor.

17. A multi-mode seeker according to claim 10 wherein the infrared sensor is located in a central aperture of the primary reflector.

18. A multi-mode seeker according to claim 5 wherein the laser energy detector comprises a quadrant detector.

* * * * *